United States Patent [19]
Birkle et al.

[11] Patent Number: 5,215,641
[45] Date of Patent: Jun. 1, 1993

[54] DEVICE FOR TRANSPORTING BULK MATERIAL COMPRISING A VIBRATOR CONVEYOR WHICH DIPS INTO A LIQUID

[75] Inventors: Siegfried Birkle, Höchstadt/Aisch; Werner Elsel, Erlangen; Johann Gehring, Spardorf; Waldemar Nippe, Erlangen; Arnolf Maurer, Bubenreuth, all of Fed. Rep. of Germany

[73] Assignee: Siemens Aktiengesellschaft, Berlin & Munich, Fed. Rep. of Germany

[21] Appl. No.: 752,674

[22] PCT Filed: Feb. 21, 1990

[86] PCT No.: PCT/EP90/00295
§ 371 Date: Nov. 6, 1991
§ 102(e) Date: Nov. 6, 1991

[87] PCT Pub. No.: WO90/10739
PCT Pub. Date: Sep. 20, 1990

[30] Foreign Application Priority Data
Mar. 6, 1989 [DE] Fed. Rep. of Germany ....... 3907186

[51] Int. Cl.[5] .............................................. C25D 17/28
[52] U.S. Cl. .................................................. 204/201
[58] Field of Search ......................................... 204/201

[56] References Cited
U.S. PATENT DOCUMENTS
4,969,985  11/1990  Birkle ................... 204/201

Primary Examiner—T. M. Tufariello
Attorney, Agent, or Firm—Kenyon & Kenyon

[57] ABSTRACT

The conveying trough of the vibrator conveyor is disposed spirally around a central pipe and is surrounded by a gasproof vessel. This vessel contains a treatment medium, preferably an electrolyte free of oxygen and water, into which the vibrator conveyor with thee central pipe dips partially. According to the invention, a gas cushion (10) is provided between the bottom (3) or the cover (4) of the central pipe (2) and the bottom (8) of the vessel (6). In this form of realization bulk material can be transported over great differences in height.

10 Claims, 3 Drawing Sheets

DEVICE FOR TRANSPORTING BULK MATERIAL COMPRISING A VIBRATOR CONVEYOR WHICH DIPS INTO A LIQUID

BACKGROUND OF THE INVENTION

The invention relates to a device for transporting bulk material, in particular for electrodeposition of aluminum from aprotic aluminum-organic electrolytes free of oxygen and water, with a vibrator conveyor. The conveying trough of the vibrator conveyor is arranged spirally around a central pipe and is surrounded by a vessel. Said vessel contains a liquid, into which the vibrator conveyor with the central pipe dips partially.

It is known that by surface improvement of metal parts, whose life can be lengthened, new areas of use can be opened up. For example, coating of light metal and ferrous materials may be appropriate, as they generally involve relatively base metals, whose surfaces may corrode under the influence of the atmosphere. By suitable pretreatment the parts are given a polished surface without cover layer. The metallic coating can be supplemented with an aftertreatment.

During the electrodeposition the pourable small parts must be held together so that each individual part has electric contact. On the other hand, the bulk material to be treated should be spread out to the extent that the metal deposition can occur on a product surface as large as possible and a current density as uniform as possible is ensured on all parts. Another essential prerequisite for obtaining satisfactory metal coatings with a uniform layer thickness is sufficient mixing of the material during the electrodeposition. The devices for electrolytic surface coating are equipped with conveyor means for the transport of the bulk material through the electrolyte, whereby in conjunction with corresponding inlet and outlet locks either continuous or intermittent feeding and removal of the material becomes possible. In addition, the movement through the electrolyte and the thorough mixing of the material as well as the transport through the electrolyte must be carried out in such a way that gentle treatment of the material is ensured and even delicate parts are not mechanically damaged during the electrodeposition.

These requirements, however, exist not only for electrolytic surface coating, in particular mass electroplating, but may occur for example also in electrochemical surface treatment of pourable material in liquids, as for example in chemical and electrolytic pickling in acids or bases, as well as in electrolytic degreasing in alkaline baths or also in electrolytic polishing. In electrolytic surface treatment the bulk material is connected either as cathode or as anode, connection as anode being employed for example in electrolytic polishing, while for example for the separation of aluminum the bulk material is preferably connected as cathode.

For mass electroplating, in particular for electrodeposition of aluminum, a known apparatus is suitable where for transporting the bulk material through the treatment bath a vibrator conveyor with a horizontal and a vertical oscillation component is provided. This vibrator conveyor transports the bulk material, utilizing the forces of gravity, in a spiral conveying trough in ascending direction around a supporting column connected with the conveying trough. The vibrator conveyor with the supporting column is lodged in a gasproof vessel containing an electrolyte into which the vibrator conveyor dips partially. As drive means serve for example oblique-action vibrators or obliquely set rods. Additionally, gravity conveyors in the form of a down pipe may be provided. Such vibrator conveyors require relatively little drive force and permit gentle conveyance of the bulk material. Intensive product movement and good electrolyte exchange as well as uniform current consumption over the entire effective surface of the spread-out material is obtained (DE-OS 35 24 510).

In such an apparatus, with the oscillating movement of the central pipe and of the conveying trough connected with it a portion of the liquid, e.g. the electrolyte, corresponding to the vibration amplitude must be displaced. This, however, becomes difficult in large installations when the outside diameter of the central pipe and hence the inside diameter of the conveying trough as well as its width and the height of the liquid column exceed predetermined values.

SUMMARY OF THE INVENTION

It is now the object of the invention, in a device for transporting bulk material in a liquid using a vibrator conveyor with closed bottom, to improve the oscillating motion of the conveying trough.

The invention is based on the finding that it would indeed be possible to increase the motor capacity of the drive or the unbalance of the eccentric and hence the oscillation amplitude of the conveying trough. But this design requires at the same time a mechanically more stable construction of the conveying trough and of the central pipe as well as of the bottom of the vessel by which the vibrator conveyor is surrounded. In addition, mechanically more resistant bearings for the centering of the vibrating central pipe are then necessary. This in turn results in a correspondingly greater mass of the vibrator conveyor, which sets additional requirements for example for the vibrating springs and for the load applied to the ground. The more powerful motors result in increased energy consumption and possibly also a higher noise level is to be expected.

The named problem is therefore solved according to the invention with the characterizing features of claim 1. With this gas cushion one obtains a vibrator conveyor system which comes close to conveyance in gaseous media with respect to the pressure conditions to be expected and is practically independent of the diameter of the central pipe. The gas cushion can be compressed and expanded by the up and down movements of the oscillating system components without the liquid column for the product conveyance being able to build up disadvantageous pressures.

Additional especially advantageous forms of realization of the device are evident from the sub-claims.

BRIEF DESCRIPTION OF THE DRAWINGS

For further elucidation of the invention reference is made to the drawing, in which various forms of realization of a device for transporting bulk material according to the invention are illustrated schematically.

DETAILED DESCRIPTION OF THE INVENTION

Figure 1:
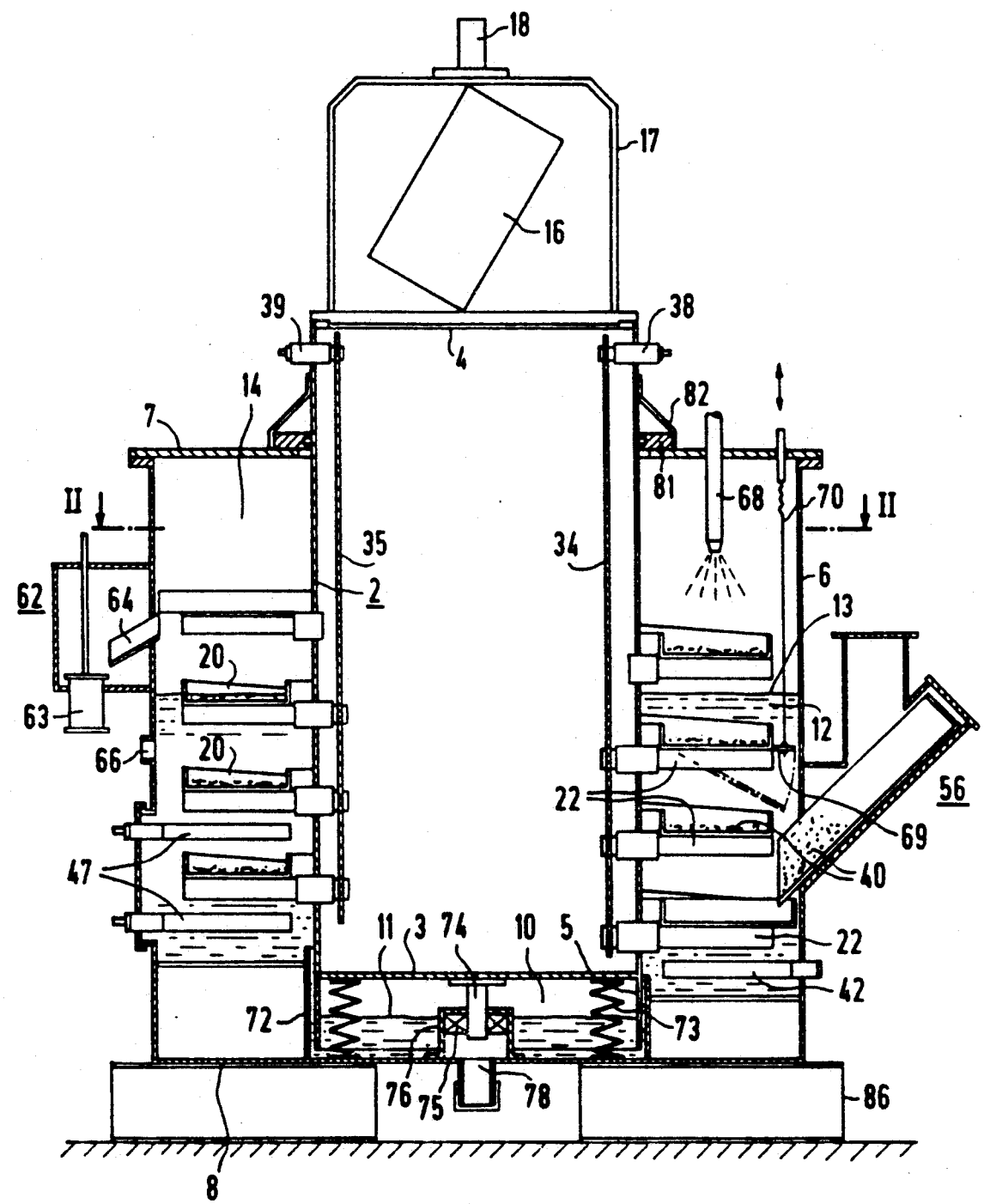
In FIG. 1 is shown a device in which the gas cushion is arranged under the bottom of the central pipe.

A device according to FIG. 1 for transporting bulk material, intended for example for the electrodeposition of aluminum from aprotic aluminum-organic electrolyte free of oxygen and water, comprises a central pipe 2 with a bottom 3 and a cover 4, which pipe protrudes from a vessel 6 whose cover 7 is connected gasproof with the central pipe 2. Enclosed between the bottom 3 of the central pipe 2 is a gas cushion 10 which is bounded laterally by a hollow-cyindrical extension 5 at the bottom 3 of the central pipe 2 and which rests in the manner of a diving bell on a lower level 11 of a liquid 12 into which the central pipe 2 dips partially and whose upper level 13 is indicated dashed in the figure. The liquid 12 may preferably be an aprotic aluminum-organic electrolyte free of oxygen and water which is disposed in the hermetically closed system consisting of the stationary vessel 6 and the oscillating central pipe 2 with the conveying trough 20.

Above cover 4 of the central pipe 2 and hence outside the vessel 6, a drive 16 for the central pipe 2 and the conveying trough 20 connected with it is provided, which drive is secured on a bearing block 17 and of which also a journal 18 is shown in the figure. The drive 16 brings about in conjunction with an eccentric not shown in the figure an oscillating motion of the central pipe 2 and hence of the conveying trough 20 disposed spirally around the central pipe 2. The conveying trough 20, which may be made for example of plastic, in particular laminated cloth, is connected with supporting stringpieces 22 and 28, which preferably serve at the same time as cathodes and traverse the vessel 2 by means of electrically insulating bushings not specifically marked. The axially superposed supporting stringpieces 22 and 28 are each connected via a common bus bar 34, 35 to a cathode terminal 38, 39, respectively. The figure also indicates three anodes, which are fastened on the cover, not specifically marked, of an anode shaft and whose electric connectors traverse this cover under electric insulation and are marked 47 in the figure. An additional anode 42 is fastened on the wall of vessel 6.

An feed shaft 56, indicated only schematically, serves to supply the bulk material 40, which is indicated in the figure merely by dots and which may consist for example of screws or other small parts, intended to be electroplated inside the installation. A discharge lock 62 comprises a discharge shaft 63 and a chute 64. Below level 13 a feed 66 for the liquid 12 is provided. A spray device is designated in the figure by 68.

Between the bottom 3 of the central pipe 2 and the bottom 8 of the vessel 6 springs are provided, only two of which are represented in the figure and designated by 72 and 73. A journal 74 for centering is mounted movable in axial direction of the central pipe 2 in a bearing 75, which may preferably be a self-aligning thrust bearing. The bearing 75 is lodged in a bearing box 76 secured on the bottom 8 of vessel 6. The bottom 8 has an opening 78 for draining the electrolyte 12. The central pipe 2 is guided movable in axial direction in a centering 81. Between the cover 7 of the stationary vessel 6 and the movable central pipe 2 a gasproof flexible connection is established by a bellows 82.

The gas cushion 10 consists of an inert gas. In connection with an electrolyte as liquid 12 it may preferably consist of an oxygen-free gas, in particular nitrogen $N_2$, the admission of which is not shown in the figure for simplification.

In this form of realization the gas cushion 10 is enclosed between the central pipe 2 with its extension 5 and the liquid 12. This gas cushion 10 can easily be compressed and expanded by the up and down movements of the oscillating system consisting of the central pipe 2 and conveying trough 20, without the liquid column being able to build up pressures unfavorable for the conveyance of the bulk material 40.

Generally the gas chamber 14 of vessel 6 lying above level 13 of the liquid 12 is filled with an inert gas, for example nitrogen, the admission of which is not represented in the figure for simplification.

The bulk material 40 to be aluminized is introduced via the feed shaft 56 into the lower region of vessel 6, and the bulk material 40 then falls onto the lower end, not specifically marked, of the conveying trough 20. On this conveying trough 20 designed as a vibratory trough and leading spirally upward, the bulk material 40 is transported upward beyond the level 13 of the electrolyte 12 and then falls into the funnel type upper end of the chute 64 leading out of vessel 6.

By the drive 16 the conveying trough 20 is excited via the central pipe 2 to oscillate with an approximately helical motion. Due to the oblique motion and the resulting accelerations and velocities, a movement is imposed on the bulk material 40 lying on the spirally upward leading trough 20, so that it is transported with continuous increase in height in the direction of conveyance. By springs 72 and 73 the central pipe 2 is mounted, able to oscillate, on the bottom 8, which preferably may be supported on a frame marked 86 in the figure which via a closable opening 78 permits evacuation of the electrolyte The drive 16, not shown in detail, may consist for example of an unbalance drive, the motor of which drives two flywheels disposed on both sides thereof with adjustable eccentricity. The driving axis of this motor is then inclined on the horizontal by a predetermined angle of e.g. 45°, so that the unbalance of the flywheels generates the previously mentioned oscillations at for example about 10 to 20 Hz and with an approximately helical movement.

Figure 2:
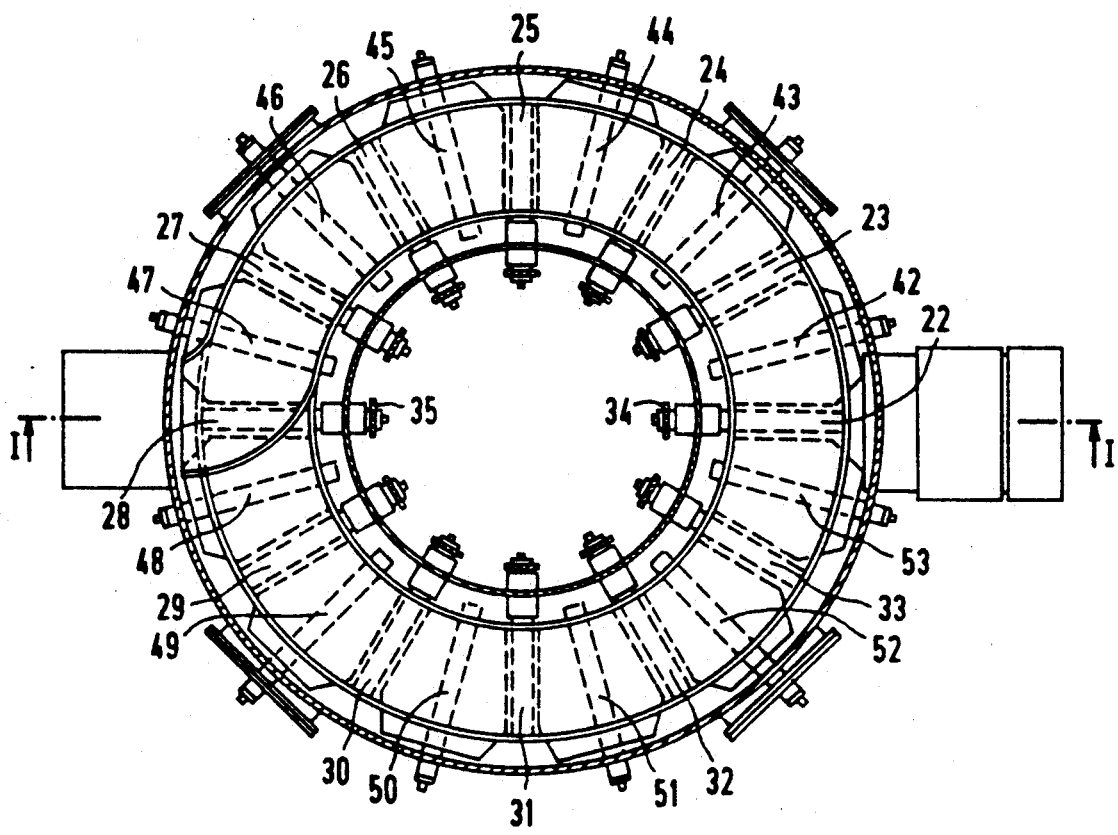
FIG. 2 shows a horizontal section of this device.

From the transverse section of FIG. 2 can be seen the radial arrangement of the cathodes 22 to 33 and of the anodes 42 to 53 inside the vessel 6. The supporting stringpieces corresponding to FIG. 1 are designated by 22 and 28. They, like all of the others, are secured in the central pipe 2 by means of their bushings not specifically marked and connected by means of the bus bars 34 and 35 to the cathode terminals 38, 39 not shown in this figure. The electric connections of the anodes 42 to 53 are passed through a cover not specifically marked by means of a lead-through and thus can easily be exchanged after the electrolyte 12 has been drained.

The bulk material 40 is contacted by contact screws of the supporting stringpieces 22 to 33, which are connected to the negative pole of a voltage source not shown in the figure, via bus bars 34 and 35 as well as the cathode terminals 38 and 39. Undesired deposition on the parts of the device is avoided by providing all surfaces in contact with the electrolyte with an insulation, which may preferably consist of a plastic coating, in particular a phenolic resin coating, or also an enamel coating.

The electric connectors of the anodes 42 to 53 are passed electrically insulated through the cover of the anode shaft or the vessel wall and connected to the positive pole of a voltage source not shown in the figure. The length of the anodes 42 to 53 is preferably not substantially greater than the width of the conveying trough 20, so that there results a large anodic surface relative to the bulk material surface and optimum conditions for the passage of the electroplating current prevail. The electrolyte exchange is intensified by the vibrations of the preferably perforated conveying trough 20.

The spraying device 68 provided above level 13 of the liquid 12 in the cover 7 of vessel 6 can apply, in the region of the top spiral of trough 20, a solvent compatible with the electrolyte 12 onto the finished aluminized bulk material 40, thus freeing the bulk material 40 from still adhering electrolyte residues. Generally this solvent is the toluene To contained in the electrolyte, which can be condensed on a condensation device disposed for example above level 13 and not specifically shown in the figure and can be resupplied to the spraying device 68.

If multiple circulation of the bulk material 40 in the electrolyte 12 is intended, the conveying trough 12 may be provided with a flap valve 69 controllable by a valve control 70 from the outside.

Figure 3:
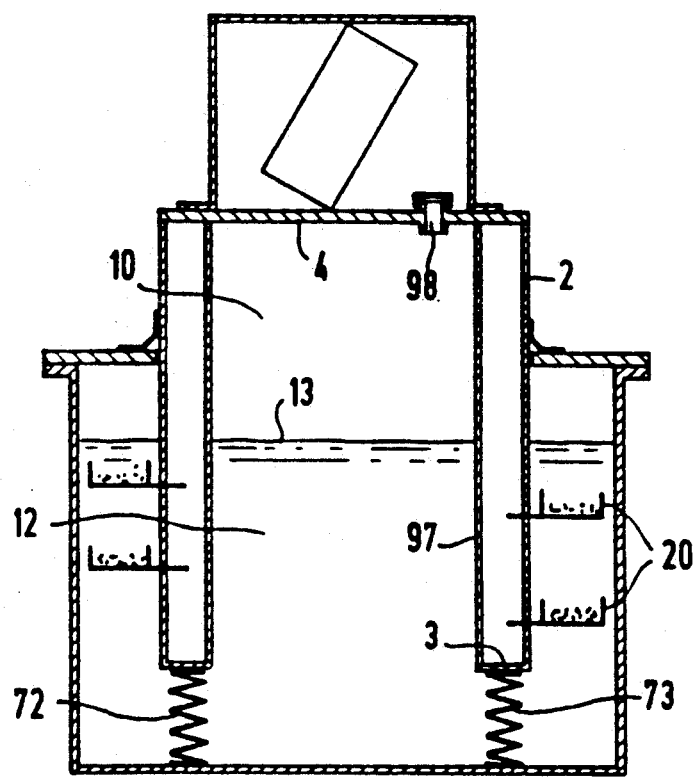
In FIG. 3 a device is represented in which the downwardly open central pipe is provided as vessel for the gas cushion.

In the form of realization of the device according to FIG. 3, in which merely the principle of the different construction is illustrated schematically, a preferably double-walled central pipe 2, open at the bottom, is used, whose bottom 3 in the form of an annular disk connects the outside wall, not specifically marked, of the central pipe 2 with an inside wall 97. Distributed on the circumference of the bottom 8 are springs, for example four springs, of which only two are visible in the figure and are marked 72 and 73 according to FIG. 1.

In this form of realization the gas cushion 10 is enclosed in the manner of a diving bell above the level 13 of electrolyte 12 between the inner wall 97 and the cover 4 of the central pipe 2. In the cover 4 a gas inlet 98 for supplying a gas filling, e.g. nitrogen, for the gas cushion 10 is indicated. As in the form of realization of FIG. 1, the conveying trough 20 is arranged spirally around the central pipe 2.

Figure 4:
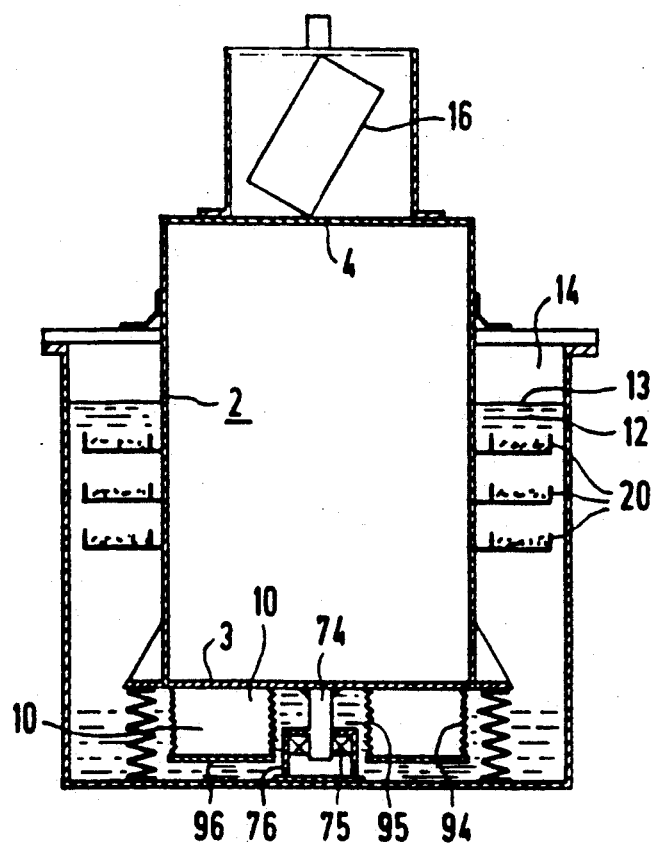
FIG. 4 illustrates a form of realization where the gas cushion is arranged under the bottom of the central pipe and is partly surrounded by a spring bellows.

In the form of realization of the device for transporting bulk material according to FIG. 4, an annular gas cushion 10 is disposed under the central pipe 2. This gas cushion 10 is enclosed by the bottom 3 and by the annular disk plate, above which the drive 15 is located. The central pipe 2 with the conveying trough 20 dips into the electrolyte 12, over whose level 13 the gas chamber 14 is located.

In this form of realization the gas cushion 10 is bounded by the bottom 3 of the central pipe 2 and by two concentrically arranged annular-cylindrical bellows 94 and 95 as well as an annular disk plate 96. In the opening, the journal 74 serving as centering bearing and movable in axial direction with the bearing 75 and the bushing 76 is arranged in accordance with the form of realization per FIG. 1.

In each of the examples a device for electroplating bulk material is provided which for this purpose is transported in an electrolyte. Alternatively the device may be provided for transporting bulk material, which runs through the device for example for the purpose of a pretreatment, for example for cleaning or pickling as well as for degreasing. In that case the device contains, instead of the electrolyte, a liquid treatment medium, for example a cleaning agent or a grease solvent. Further the device can be used for the aftertreatment of a bulk material, for example for water removal.

What is claimed is:

1. A device for transporting bulk material, comprising: a vibrator conveyor having a spiral conveying trough; a central pipe which together with the conveying trough form an assembly, said assembly being able to oscillate; a gasproof vessel containing a liquid, the vibrator conveyor dipping at least partially into said liquid; a gas cushion disposed between the assembly and the liquid such that the gas cushion is compressed and expanded in response to up and down oscillations of the assembly.

2. The device according to claim 1 wherein the central pipe has a closed bottom and includes a hollow-cylindrical pipe extension which together enclose the gas cushion containing the liquid in a driving bell manner.

3. The device according to claim 1 wherein the central pipe has a resilient suspension.

4. The device according to claim 2 wherein the central pipe has a resilient suspension.

5. The device according to claim 1 wherein the central pipe has an upper end which is closed off by a cover, said cover, central pipe and liquid closing off the gas cushion in a driving bell manner.

6. The device according to claim 5 wherein the central pipe is double-walled and has an annular disc type bottom, the device further comprising spiral springs disposed between the bottom of the central pipe and a bottom of the vessel.

7. The device according to claim 1 wherein the gas cushion is disposed in an annular gas chamber, the annular gas chamber being enclosed by: a bottom of the central pipe from above; an annular plate from below; an outer annular-cylindrical bellows, laterally outside; and an inner annular-cylindrical bellows, laterally inside.

8. The device according to claim 7 wherein the inner annular-cylindrical bellows at least partially surrounds a centering bearing for the central pipe.

9. The device according to claim 1 further comprising a driving means for causing swinging motion of the conveying trough, the driving means being disposed above the central pipe and outside the vessel.

10. The device according to claim 9 wherein the central pipe includes a bearing block for the driving means.

* * * * *